US012556667B2

(12) United States Patent
Dai et al.

(10) Patent No.: US 12,556,667 B2
(45) Date of Patent: Feb. 17, 2026

(54) WAVELENGTH CONVERSION MODULE AND PROJECTION DEVICE

(71) Applicant: Coretronic Corporation, Hsin-Chu (TW)

(72) Inventors: Meng-Syuan Dai, Hsin-Chu (TW); Chih-Sheng Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 519 days.

(21) Appl. No.: 17/988,754

(22) Filed: Nov. 16, 2022

(65) Prior Publication Data

US 2023/0199157 A1  Jun. 22, 2023

(30) Foreign Application Priority Data

Dec. 17, 2021 (CN) .......................... 202123182160.7

(51) Int. Cl.
*H04N 9/31* (2006.01)

(52) U.S. Cl.
CPC ......... *H04N 9/3158* (2013.01); *H04N 9/3144* (2013.01)

(58) Field of Classification Search
CPC .... H04N 9/312; H04N 9/3102; H04N 9/3105; H04N 9/3108; H04N 9/3114; H04N 9/3117; H04N 9/3141; H04N 9/3144; H04N 9/3158; H04N 9/3161; G02B 26/00; G02B 26/008; G03B 21/00; G03B 21/005; G03B 21/006; G03B 21/008; G03B 21/28; G03B 21/142; G03B 21/145; G03B 21/2013; G03B 21/2033; G03B 21/2053; G03B 21/2066
See application file for complete search history.

(56) References Cited

U.S. PATENT DOCUMENTS

| | | | |
|---|---|---|---|
| 9,625,798 B2 * | 4/2017 | Kase | H04N 5/74 |
| 11,022,867 B2 * | 6/2021 | Liu | G03B 21/2066 |
| 2008/0192372 A1 * | 8/2008 | Lin | G02B 26/008 |
| | | | 359/891 |
| 2014/0354960 A1 * | 12/2014 | Miyazaki | H04N 9/3111 |
| | | | 359/723 |
| 2017/0269464 A1 * | 9/2017 | Tsai | G02B 26/008 |

(Continued)

FOREIGN PATENT DOCUMENTS

| | | |
|---|---|---|
| CN | 107102504 | 8/2017 |
| CN | 208937894 | 6/2019 |
| TW | M565813 | 8/2018 |

*Primary Examiner* — Sultan Chowdhury
(74) *Attorney, Agent, or Firm* — JCIPRNET (57) ABSTRACT

A wavelength conversion module, including a substrate, a wavelength conversion member, and a fixing ring, is provided. The substrate has an annular groove. The wavelength conversion member is disposed in the annular groove of the substrate. The fixing ring is disposed on the substrate and is configured to press on an inner region and an outer region of the annular groove and a portion of the wavelength conversion member to expose another portion of the wavelength conversion member and fix the wavelength conversion member on the substrate. In addition, a projection device, applying the wavelength conversion module, is also provided. The wavelength conversion module of the present invention and the projection device applying the wavelength conversion module have better structural reliability and assembly flexibility.

18 Claims, 9 Drawing Sheets

(56) References Cited

U.S. PATENT DOCUMENTS

2018/0259834 A1\* 9/2018 Endo .................... G03B 21/204
2019/0346753 A1\* 11/2019 Pan ..................... H04N 9/3102
2019/0391470 A1\* 12/2019 Pan .................... G03B 21/2066

\* cited by examiner

WAVELENGTH CONVERSION MODULE AND PROJECTION DEVICE

CROSS-REFERENCE TO RELATED APPLICATION

This application claims the priority benefit of China application serial no. 202123182160.7 filed on Dec. 17, 2021. The entirety of the above-mentioned patent application is hereby incorporated by reference herein and made a part of this specification.

BACKGROUND

Technical Field

The present invention relates to an optical module and a projection device, and in particular relates to a wavelength conversion module and a projection device having the wavelength conversion module.

Description of Related Art

In the prior art, the wavelength conversion layer is glued on the turntable. Due to the gradual increase in demand for high brightness of laser projection systems, increasing the number of laser light sources or using higher wattage lasers will increase the energy density of light spots on the turntable. In the case where the turntable is not additionally equipped with a heat dissipation module, the heat dissipation effect of the phosphor wheel is limited, and heat energy is easily accumulated on the turntable such that the turntable cannot be cooled down, thereby causing the problem of overheating of the adhesive of the wavelength conversion layer. If the adhesive is in an over-temperature state, aging of the adhesive would be accelerated more easily, causing the wavelength conversion layer to be detached more easily. However, if the wavelength conversion layer is fixed on the turntable by physical means such as locking, the locking member may pass through the path irradiated by the laser beam when the turntable is rotating, causing other problems in the wavelength conversion of the beam, thereby reducing the image quality of the projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The present invention provides a wavelength conversion module, which has better structural reliability.

The present invention also provides a projection device, which includes the wavelength conversion module and has better projection quality and product competitiveness.

In order to achieve one of, a part of, or all of the above objectives or other objectives, an embodiment of the present invention provides a wavelength conversion module, which includes a substrate, a wavelength conversion member, and a fixing ring. The substrate has an annular region, and a groove is formed on at least a portion of the annular region. The wavelength conversion member is disposed in the groove of the substrate. The fixing ring is disposed on the substrate and is configure to press on a portion of the wavelength conversion member corresponding to an inner region and an outer region of the groove, so as to expose another portion of the wavelength conversion member and fix the wavelength conversion member on the substrate, wherein the inner region and the outer region of the groove have different radial distances from a center of the substrate.

In an embodiment of the present invention, the groove is O-shaped and is formed on all of the annular region.

In an embodiment of the present invention, the fixing ring includes an inner fixing ring and an outer fixing ring. The portion of the wavelength conversion member includes an inner portion and an outer portion. The inner fixing ring is configured to press on the inner portion of the wavelength conversion member corresponding to the inner region of the groove. The outer fixing ring is configured to press on the outer portion of the wavelength conversion member corresponding to the outer region of the groove.

In an embodiment of the present invention, a width of the inner fixing ring is greater than or equal to a width of the outer fixing ring.

In an embodiment of the present invention, the groove is C-shaped and is formed on the portion of the annular region.

In an embodiment of the present invention, the fixing ring includes an inner fixing ring, an outer fixing ring, and a connecting portion. The portion of the wavelength conversion member includes an inner portion and an outer portion. The inner fixing ring is configured to press on the inner portion of the wavelength conversion member corresponding to the inner region of the groove. The outer fixing ring is configured to press on the outer portion of the wavelength conversion member corresponding to the outer region of the groove. The connecting portion connects the inner fixing ring and the outer fixing ring, and the inner fixing ring, the outer fixing ring, and the connecting portion are integrally formed.

In an embodiment of the present invention, a width of the inner fixing ring is greater than or equal to a width of the outer fixing ring.

In an embodiment of the present invention, the wavelength conversion module further includes a reflective layer, which is disposed on the fixing ring and located at the connecting portion.

In an embodiment of the present invention, the wavelength conversion module further includes multiple locking members, which pass through the fixing ring and are locked on the substrate.

In an embodiment of the present invention, the substrate includes a first positioning element, and the fixing ring includes a second positioning element. The first positioning element and the second positioning element are fitted with each other to fix the fixing ring on the substrate.

In an embodiment of the present invention, one of the first positioning element and the second positioning element is a concave portion, and the other one of the first positioning element and the second positioning element is a convex portion.

In an embodiment of the present invention, the wavelength conversion module further includes a driving assembly, which drives the substrate and the fixing ring to rotate with a rotating shaft of the driving assembly as a central axis. The fixing ring is disposed around the rotating shaft of the driving assembly and is perpendicular to the rotating shaft.

In an embodiment of the present invention, the substrate and the fixing ring are respectively disposed coaxially with the driving assembly.

In an embodiment of the present invention, the wavelength conversion module further includes an inner elastic collar and an outer elastic collar. The inner elastic collar is sleeved on the rotating shaft of the driving assembly and is configured to press onto the fixing ring. The outer elastic collar is sleeved around the substrate and the fixing ring to fix the substrate and the fixing ring together.

In an embodiment of the present invention, the outer elastic collar includes a first limiting portion, a second limiting portion, and a connecting limiting portion. The connecting limiting portion connects the first limiting portion and the second limiting portion. One of the first limiting portion and the second limiting portion is located on the substrate, and the other one of the first limiting portion and the second limiting portion is located on the fixing ring to clamp the substrate and the fixing ring between the first limiting portion and the second limiting portion.

In an embodiment of the present invention, the wavelength conversion module further includes a thermal interface material (TIM), which is disposed in the groove of the substrate and located between the wavelength conversion member and the groove.

In order to achieve one of, a part of, or all of the above objectives or other objectives, an embodiment of the present invention provides a projection device including an illumination system, a light valve, and a projection lens. The illumination system includes a light source module and a wavelength conversion module. The illumination system is configured to provide an illumination light beam. The light source module is configured to provide an excitation light beam. The wavelength conversion module receives the excitation light beam and is disposed on a transmission path of the illumination light beam. The wavelength conversion module includes a substrate, a wavelength conversion member, and a fixing ring. The substrate has an annular region, and a groove is formed on at least a portion of the annular region. The wavelength conversion member is disposed in the groove of the substrate. The fixing ring is disposed on the substrate and is configured to press on a portion of the wavelength conversion member corresponding to an inner region and an outer region of the groove, so as to expose another portion of the wavelength conversion member and fix the wavelength conversion member on the substrate, wherein the inner region and the outer region of the groove have different radial distances from a center of the substrate. The light valve is disposed on the transmission path of the illumination light beam to convert the illumination light beam into an image light beam. The projection lens is disposed on a transmission path of the image light beam to project the image light beam out of the projection device.

In an embodiment of the present invention, the excitation light beam forms a light spot on the wavelength conversion module, and the light spot is located on the another portion of the wavelength conversion member exposed by the fixing ring.

Based on the above, the embodiments of the present invention have at least one of the following advantages or effects. In the design of the wavelength conversion module of the present invention, the fixing ring is configured to press on a portion of the wavelength conversion member corresponding to the inner region and the outer region of the groove of the substrate, so as to fix the wavelength conversion member on the substrate. Compared with the prior art of using glue to fix the wavelength conversion layer and the substrate, the wavelength conversion module of the present invention can eliminate the peeling of the wavelength conversion layer due to thermal degradation of the glue in the prior art. The wavelength conversion module of the present invention has better structural reliability and assembly flexibility, and can be disassembled and adjusted at any time. In addition, the projection device adopting the wavelength conversion module of the present invention can have better projection quality and product competitiveness.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" Component is directly "adjacent to" "B" component or one or more additional components are between "A" component and "B" component. Accordingly, the drawings and descriptions will be regarded as illustrative in nature and not as restrictive.

Figure 1:
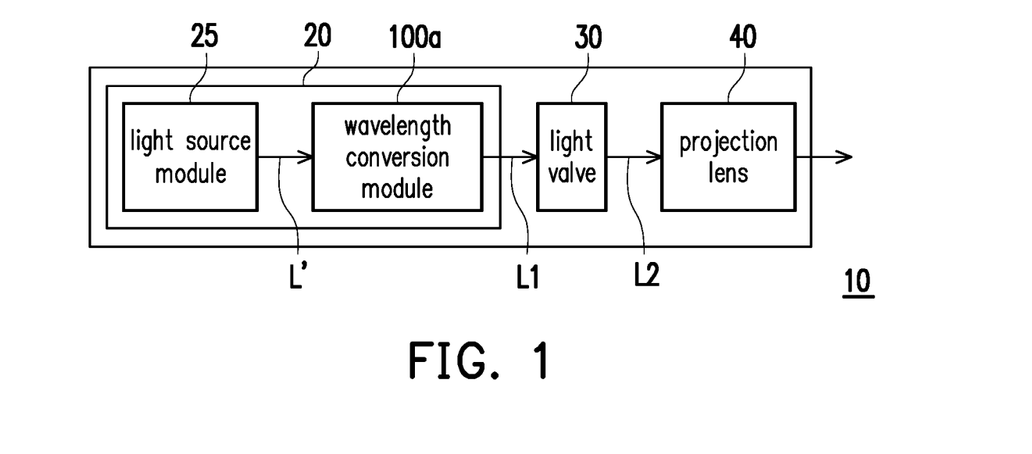
FIG. 1 is a schematic view of a projection device according to an embodiment of the present invention.

FIG. 1 is a schematic view of a projection device according to an embodiment of the present invention. Referring to FIG. 1 first, in this embodiment, the projection device 10 includes an illumination system 20, a light valve 30, and a projection lens 40. The illumination system 20 is configured to provide an illumination light beam L1, wherein the illumination system 20 includes a light source module 25 and a wavelength conversion module 100a. The light source module 25 is configured to provide an excitation light beam L'. The wavelength conversion module 100a is configured on a transmission path of the excitation light beam L' and receives the excitation light beam L'. The wavelength conversion module 100a converts at least part of the excitation light beam L' into a converted light beam. Here, the illumination light beam L1 includes at least one of the converted light beam and the excitation light beam L'. The light valve 30 is disposed on the transmission path of the illumination light beam L1 to convert the illumination light beam L1 into an image light beam L2. The projection lens 40 is disposed on a transmission path of the image light beam L2 to project the image light beam L2 out of the projection device 10. The wavelength conversion module 100a is, for example, a phosphor wheel to repeatedly enter a transmission path of the excitation light beam L'.

In detail, the light source module 25 used in this embodiment is, for example, a laser diode (LD), such as a laser diode bank. Specifically, any light source that meets the volume requirement in actual design can be implemented, and the present invention is not limited thereto. The light valve 30 is, for example, a reflective light modulator such as a liquid crystal on silicon panel (LCoS panel) and a digital micro-mirror device (DMD). In an embodiment, the light valve 30 is, for example, a transparent liquid crystal panel, an electro-optical modulator, a magneto-optic modulator, an acousto-optic modulator (AOM), and other transmissive optical modulators, but this embodiment does not limit the form and type of the light valve 30. Sufficient teaching, suggestion, and implementation description of the detailed steps and implementation for the light valve 30 to convert the illumination light beam L1 into the image light beam L2 can be obtained from the common knowledge in the art, so there will be no repetition. In addition, the projection lens 40 includes, for example, a combination of one or more optical lenses with diopter, such as various combinations of non-planar lenses such as biconcave lenses, biconvex lenses, meniscus lenses, convex-concave lenses, plano-convex lenses, and plano-concave lenses. In an embodiment, the projection lens 40 may also include a planar optical lens to convert the image light beam L2 from the light valve 30 into a projection light beam by reflection or transmission to be projected out of the projection device 10. Herein, this embodiment does not limit the form and type of the projection lens 40.

Figure 2A:
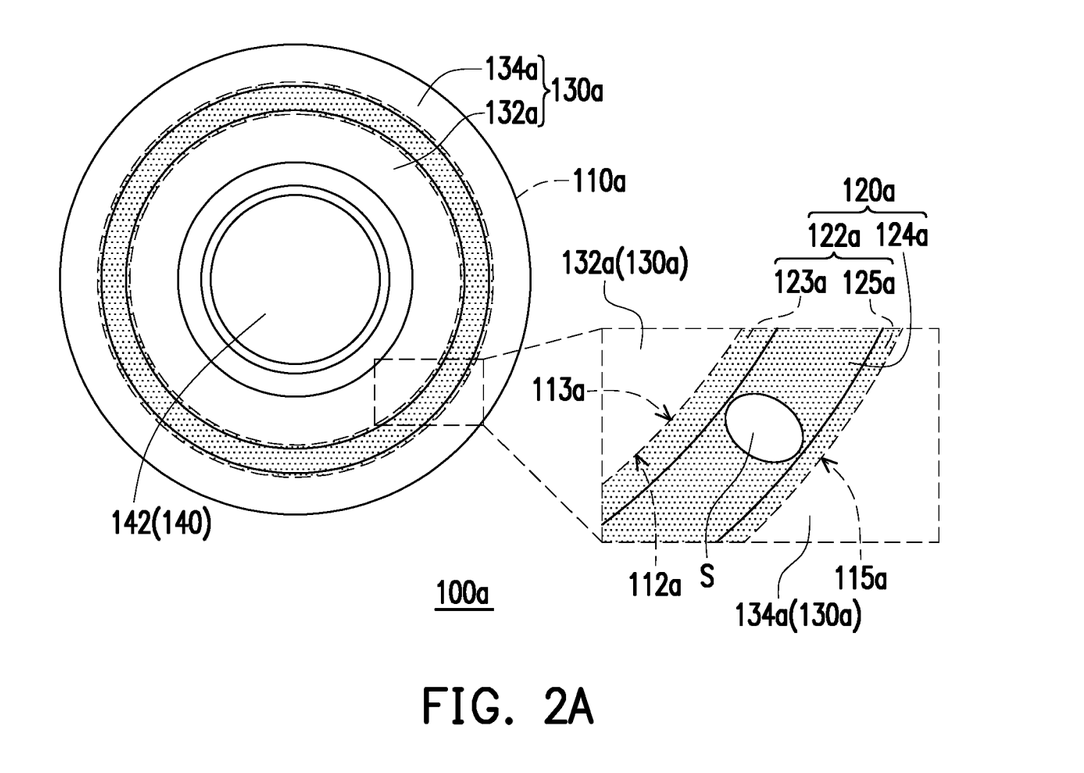
FIG. 2A is a top schematic view of a wavelength conversion module of the projection device of FIG. 1.
Figure 2B:
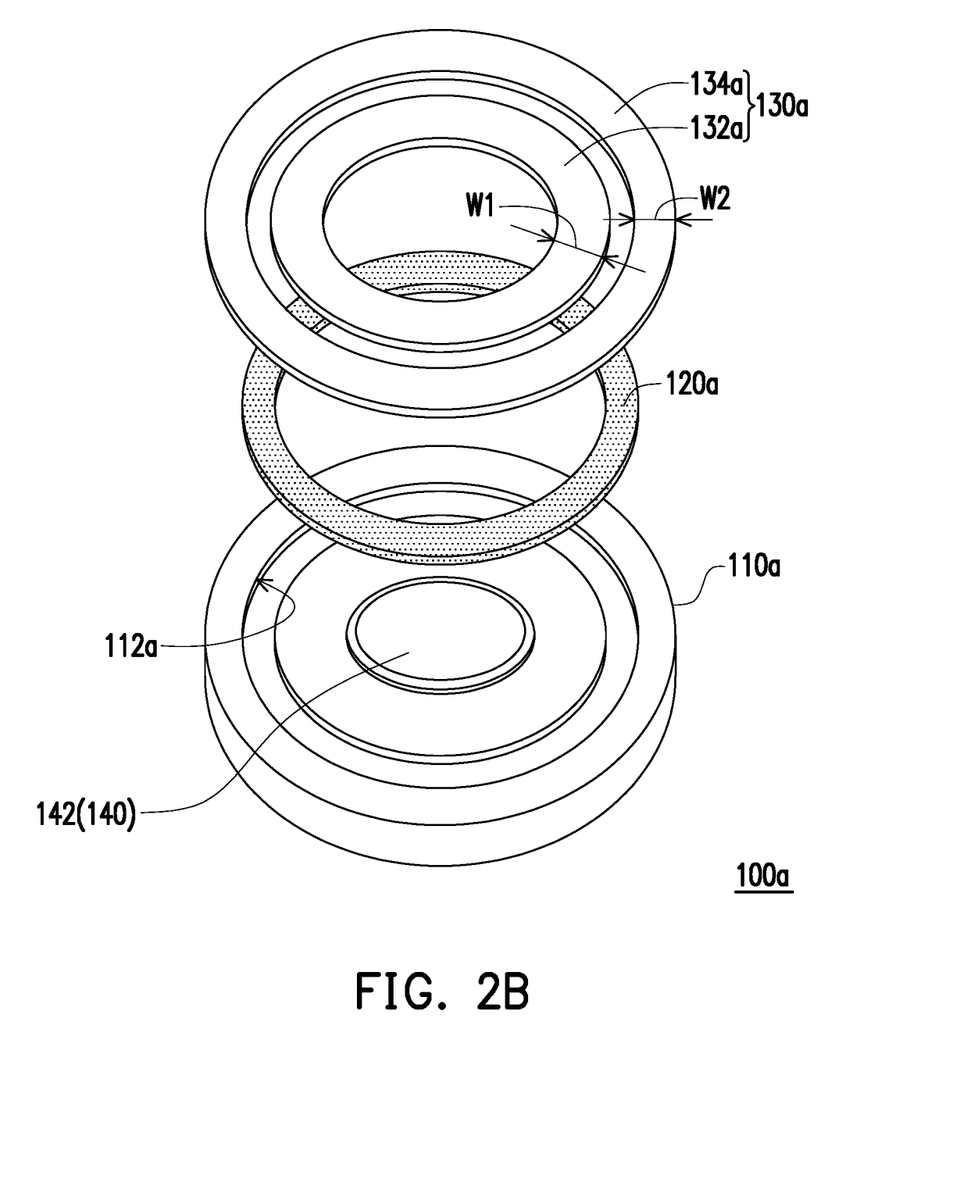
FIG. 2B is a partial exploded schematic view of the wavelength conversion module of FIG. 2A.

FIG. 2A is a top schematic view of a wavelength conversion module of the projection device of FIG. 1. FIG. 2B is a partial exploded schematic view of the wavelength conversion module of FIG. 2A. Referring to FIG. 2A and FIG. 2B at the same time, in this embodiment, the wavelength conversion module 100a includes a substrate 110a, a wavelength conversion member 120a, and a fixing ring 130a. The substrate 110a has an annular region, and a groove 112a is formed on at least a portion of the annular region. The wavelength conversion member 120a is disposed in the groove 112a of the substrate 110a. The fixing ring 130a is disposed on the substrate 110a and is configured to press on a portion of the wavelength conversion member 120a corresponding to an inner region 113a and an outer region 115a of the groove 112a, so as to expose another portion 124a (i.e. the portion not pressed by the fixing ring 130a) of the wavelength conversion member 120a and to fix the wavelength conversion member 120a on the substrate 110a. The inner region 113a and the outer region 115a of the groove 112a have different radial distances from a center of the substrate 110a.

In detail, the shape of the groove 112a of the substrate 110a of this embodiment is embodied as O-shaped and is formed on all of the annular region, but not limited thereto. The substrate 110a may be a high thermally conductive transparent or high thermally conductive opaque substrate, such as sapphire, aluminum nitride, aluminum oxide, ceramic composite material, or metal alloy, but not limited thereto. The wavelength conversion member 120a has, for example, a block structure or a sheet structure, which is, for example, a phosphor material, and is configured to convert the wavelength of the illumination light beam L1 in FIG. 1 and to respectively generate converted light beams with different wavelengths. The wavelength conversion member 120a is disposed in the groove 112a of the substrate 110a, wherein the wavelength conversion member 120a may be aligned with or slightly higher than the surface of the substrate 110a.

In particular, the fixing ring 130a of this embodiment includes an inner fixing ring 132a and an outer fixing ring 134a. The portion 122a of the wavelength conversion member 120a includes an inner portion 123a and an outer portion 125a. The inner fixing ring 132a is configured to press on the inner portion 123a of the wavelength conversion member 120a corresponding to the inner region 113a of the groove 112a. The outer fixing ring 134a is configured to press on the outer portion 125a of the wavelength conversion member 120a corresponding to the outer region 115a of the groove 112a. That is, both the inner fixing ring 132a and the outer fixing ring 134a fix wavelength conversion member 120a on the substrate 110a by physical compression, and the wavelength conversion member 120a is preferably a non-powder form. The excitation light beam L' (referring to FIG. 1)

forms a light spot S on the wavelength conversion module 100a, wherein the light spot S is embodied as being located on the another portion 124a of the wavelength conversion member 120a exposed by the fixing ring 130a. Here, a width W1 of the inner fixing ring 132a may be greater than or equal to a width W2 of the outer fixing ring 134a. The material of the fixing ring 130a is a material that can withstand the temperature of the substrate 110a when operating in the projection device 10 (referring to FIG. 1), such as metal, thermosetting plastic, or ceramics, which is not limited herein.

In addition, the wavelength conversion module 100a of this embodiment further includes a driving assembly 140, which drives the substrate 110a and the fixing ring 130a to rotate with a rotating shaft 142 of the driving assembly 140 as the central axis. The fixing ring 130a is disposed around the rotating shaft 142 of the driving assembly 140 and is perpendicular to the rotating shaft 142. The substrate 110a and the fixing ring 130a are respectively configured coaxially with the driving assembly 140. Here, the driving assembly 140 is, for example, a motor, but not limited thereto. Of course, in other embodiments that are not illustrated, the wavelength conversion module may not have a driving assembly, which means that the wavelength conversion module is not a wheel type module and does not rotate, and the other embodiments still belong to the scope to be protected by the present invention.

In short, in this embodiment, the fixing ring 130a is configured to press on a portion of the wavelength conversion member 120a corresponding to the inner region 113a and the outer region 115a of the groove 112a, so as to fix the wavelength conversion member 120a on the substrate 110a. Therefore, compared to the prior art of adopting glue to fix the wavelength conversion layer and the substrate, the wavelength conversion module 100a of this embodiment has better structural reliability and assembly flexibility, can be disassembled and adjusted at any time, and can eliminate the case where the wavelength conversion layer peels off due to thermal degradation. In addition, the projection device 10 adopting the wavelength conversion module 100a of this embodiment can have better projection quality and product competitiveness.

It is to be noted that the following embodiments continue to use the reference numerals and a part of the contents of the above embodiments, wherein the same reference numerals are used to denote the same or similar elements, and the description of the same technical contents is omitted. For the description of the omitted part, reference may be made to the above embodiments, and details are not repeated in the following embodiments.

Figure 3A:
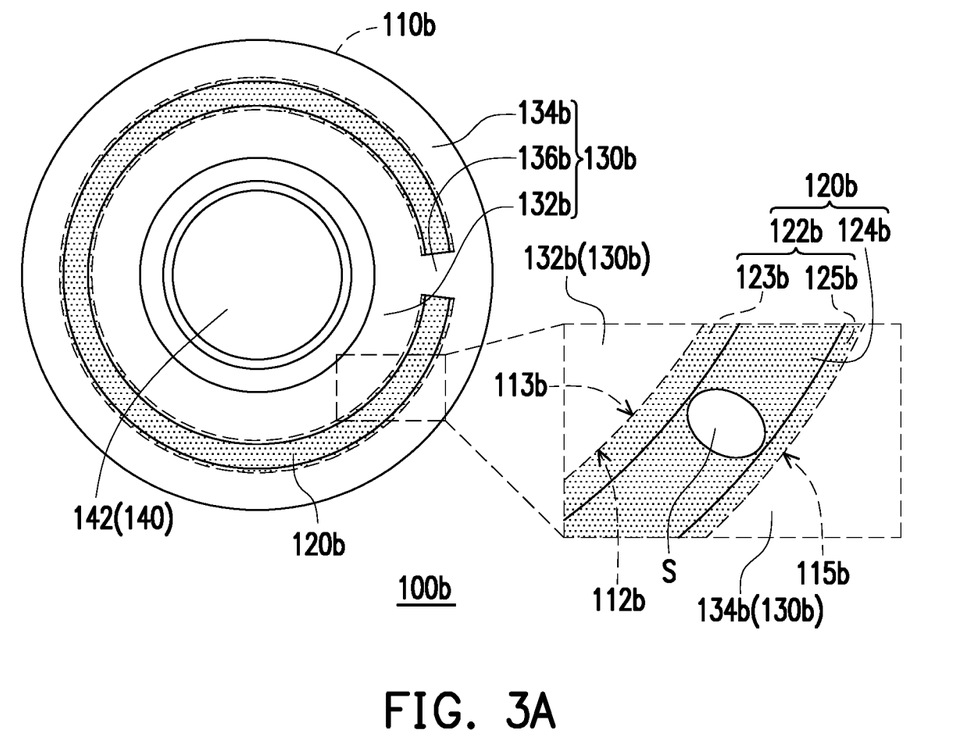
FIG. 3A is a top schematic view of a wavelength conversion module according to an embodiment of the present invention.
Figure 3B:
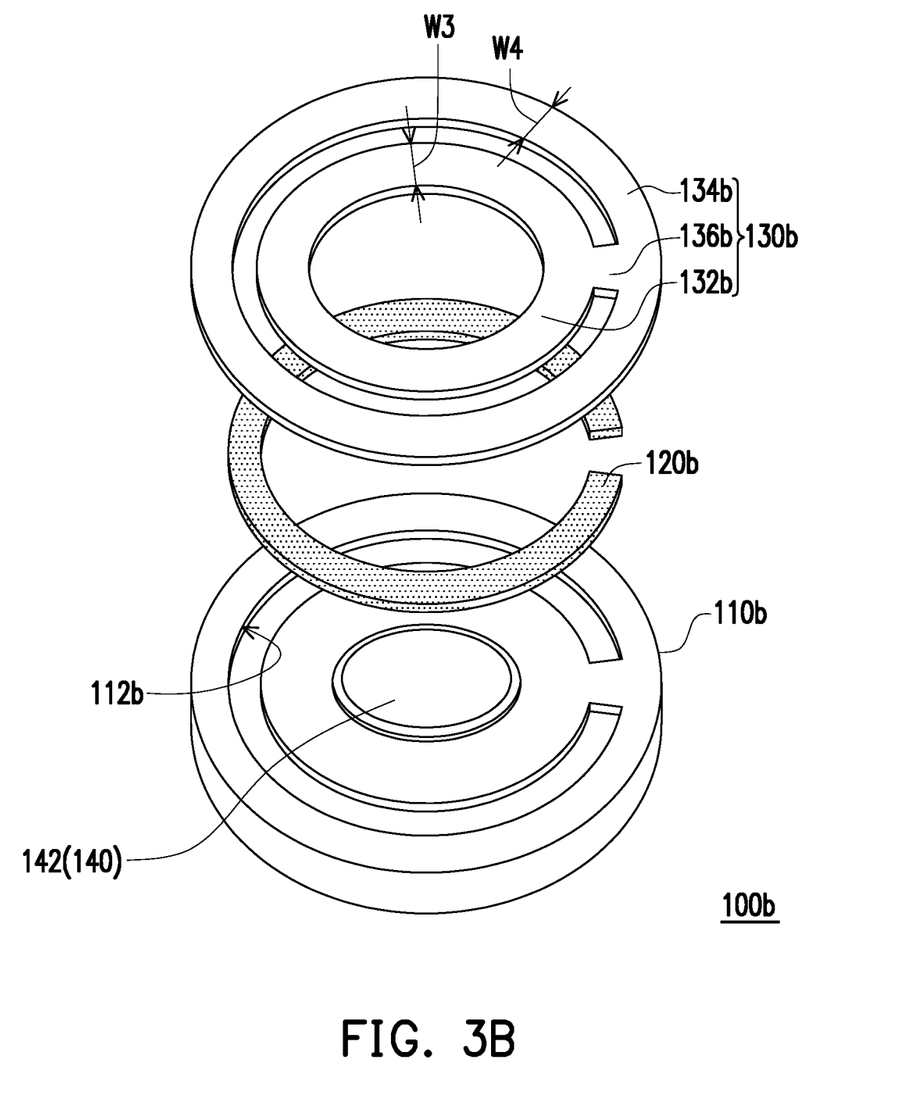
FIG. 3B is a partial exploded schematic view of the wavelength conversion module of FIG. 3A.

FIG. 3A is a top schematic view of a wavelength conversion module according to an embodiment of the present invention. FIG. 3B is a partial exploded schematic view of the wavelength conversion module of FIG. 3A. Referring to FIG. 2A, FIG. 2B, FIG. 3A, and FIG. 3B at the same time, a wavelength conversion module 100b of this embodiment is similar to the wavelength conversion module 100a of FIG. 2A with the difference between the two being that in this embodiment, the shape of a groove 112b of a substrate 110b is embodied as C-shaped (i.e. an incomplete ring shape) and is formed on the portion of the annular region. A fixing ring 130b includes an inner fixing ring 132b, an outer fixing ring 134b, and a connecting portion 136b. A portion 122b of a wavelength conversion member 120b includes an inner portion 123b and an outer portion 125b. The inner fixing ring 132b is configured to press on the inner portion 123b of the wavelength conversion member 120b corresponding to the inner region 113b of the groove 112b. The inner fixing ring 134b is configured to press on the outer portion 125b of the wavelength conversion member 120b corresponding to the outer region 115b of the groove 112b. The connecting portion 136b connects the inner fixing ring 132b and the outer fixing ring 134b, wherein in conjunction with electronic control and optical configuration, the connecting portion 136b may enter the path of the excitation beam L' during the period when the excitation light beam L' (referring to FIG. 1) does not need to excite the wavelength conversion member 120b (or the period when the wavelength conversion member 120b not entering the path). Here, the materials of the inner fixing ring 132b, the outer fixing ring 134b, and the connecting portion 136b are the same, which means that the inner fixing ring 132b, the outer fixing ring 134b, and the connecting portion 136b are integrally formed. The light spot S is located on another portion 124b of the wavelength conversion member 120b exposed by the fixing ring 130b. In addition, a width W3 of the inner fixing ring 132b may be greater than or equal to a width W4 of the outer fixing ring 134b.

Figure 4A:
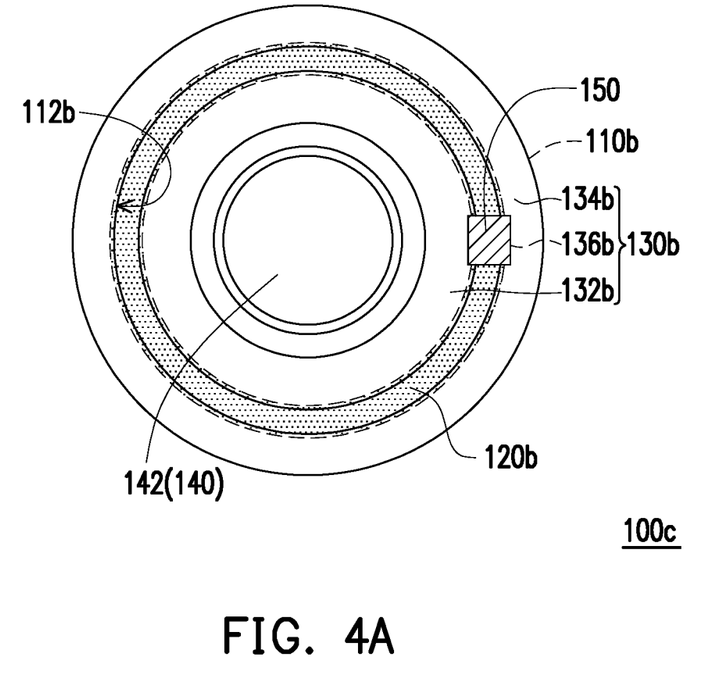
FIG. 4A is atop schematic view of a wavelength conversion module according to another embodiment of the present invention.

FIG. 4A is atop schematic view of a wavelength conversion module according to another embodiment of the present invention. Referring to FIG. 3A and FIG. 4A at the same time, a wavelength conversion module 100c of this embodiment is similar to the wavelength conversion module 100b of FIG. 3A with the difference between the two being that in this embodiment, the wavelength conversion module 100c further includes a reflective layer 150, wherein the reflective layer 150 is disposed on the fixing ring 130b and located at the connecting portion 136b to achieve the above-mentioned reflection effect. Here, the reflective layer 150 is fixed to the connecting portion 136b of the fixing ring 130b through coating or attaching a reflective material, but not limited hereto.

Figure 4B:
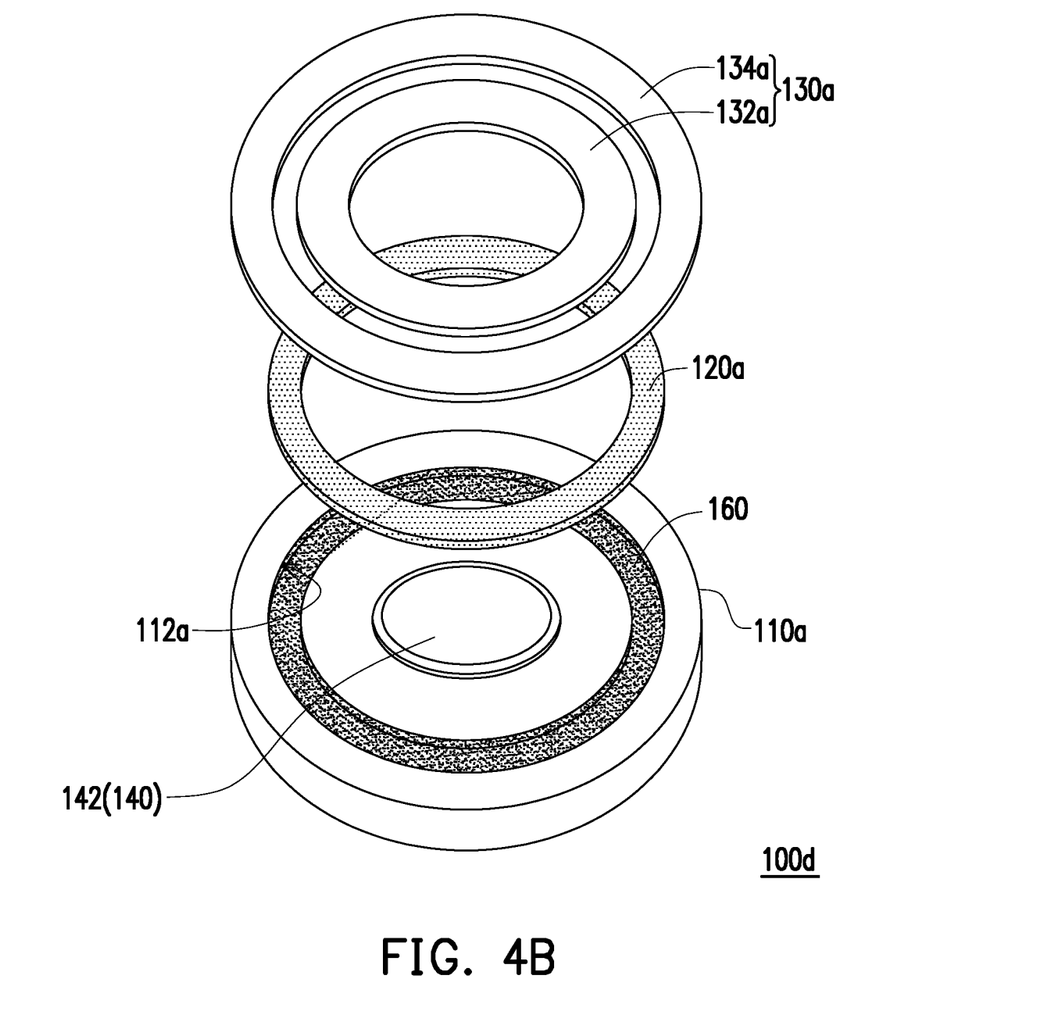
FIG. 4B is a partial exploded schematic view of a wavelength conversion module according to another embodiment of the present invention.

FIG. 4B is a partial exploded schematic view of a wavelength conversion module according to another embodiment of the present invention. Referring to FIG. 2B and FIG. 4B at the same time, a wavelength conversion module 100d of this embodiment is similar to the wavelength conversion module 100a of FIG. 2B with the difference between the two being that in this embodiment, the wavelength conversion module 100d further includes a thermal interface material 160, wherein the thermal interface material 160 is disposed in the groove 112a of the substrate 110a and located between the wavelength conversion member 120a and the groove 112a. With the thermal interface material layer 160, the heat transfer between the wavelength conversion member 120a and the groove 112a can be effectively improved, and the generated heat can be transferred to the outside more quickly and efficiently. Here, the thermal interface material layer 160 of this embodiment is, for example, a thermally conductive paste or a thermally conductive film, but not limited thereto.

Figure 5:
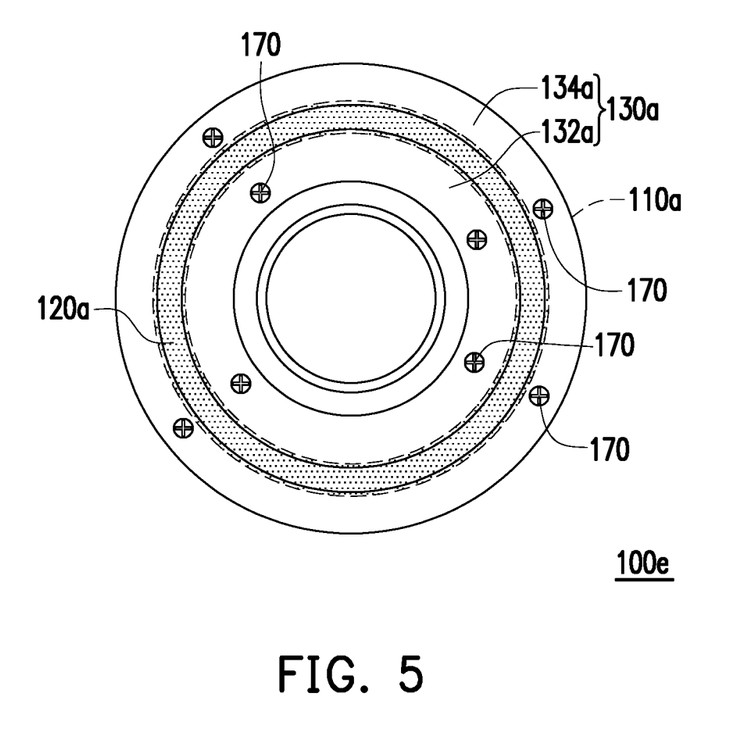
FIG. 5 is a top schematic view of a wavelength conversion module according to another embodiment of the present invention.

FIG. 5 is a top schematic view of a wavelength conversion module according to another embodiment of the present invention. Referring to FIG. 2A and FIG. 5 at the same time, a wavelength conversion module 100e of this embodiment is similar to the wavelength conversion module 100a of FIG. 2A with the difference between the two being that in this embodiment, the wavelength conversion module 100e further includes a locking member 170, wherein the locking member 170 passes through the fixing ring 130a and is locked on the substrate 110a, for example, along an axial direction of the rotating shaft. Here, the locking member 170 is, for example, a screw or a bolt, wherein the number and position of the locking member 170 are not limited, as long as the fixing ring 130a can be firmly fixed on the substrate 110a.

Figure 6A:
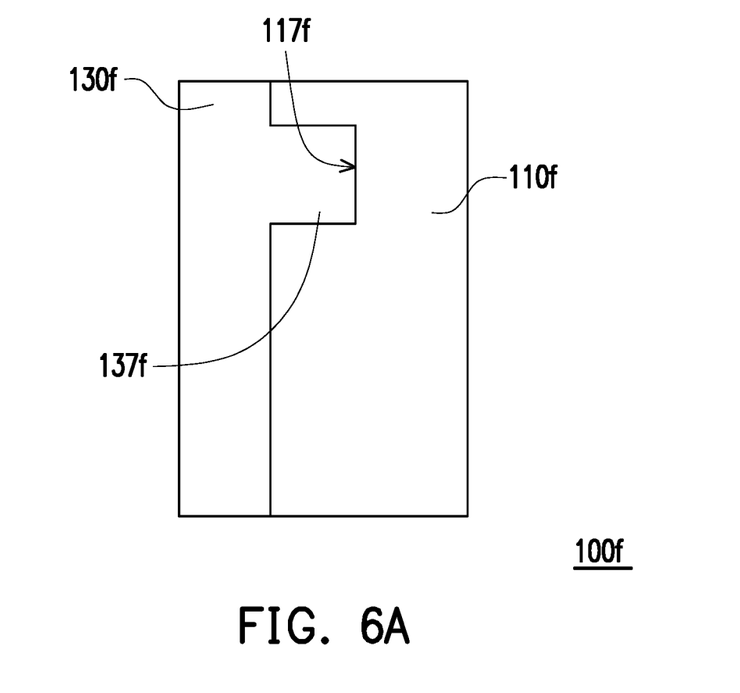
FIG. 6A is a side schematic view of a wavelength conversion module according to another embodiment of the present invention.

FIG. 6A is a side schematic view of a wavelength conversion module according to another embodiment of the present invention. Referring to FIG. 5 and FIG. 6A at the same time, a wavelength conversion module 100f of this embodiment is similar to the wavelength conversion module 100e of FIG. 5 with the difference between the two being that a positioning and fitting manner is used in this embodiment instead of the locking manner in FIG. 5. In detail, in this embodiment, a substrate 110f includes a first positioning element 117f, and a fixing ring 130f includes a second positioning element 137f. The first positioning element 117f and the second positioning element 137f are fitted with each other to fix the fixing ring 130f on the substrate 110f. Here, the first positioning element 117f is embodied as a concave portion, and the second positioning element 137f is embodied as a convex portion, but not limited thereto.

Figure 6B:
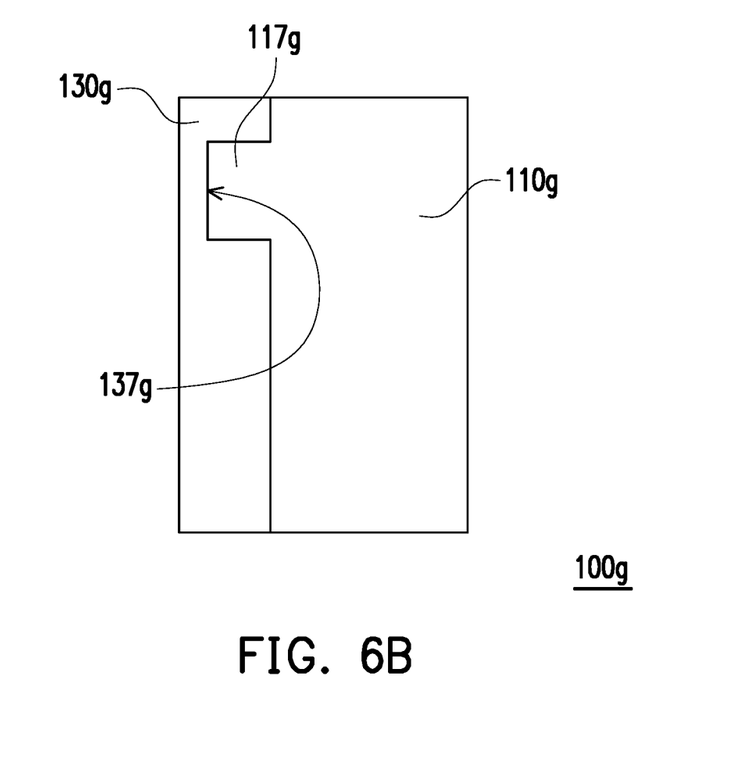
FIG. 6B is a side schematic view of a wavelength conversion module according to another embodiment of the present invention.

FIG. 6B is a side schematic view of a wavelength conversion module according to another embodiment of the present invention. Referring to FIG. 5 and FIG. 6B at the same time, a wavelength conversion module 100g of this embodiment is similar to the wavelength conversion module 100e of FIG. 5 with the difference between the two being that a positioning and fitting manner is used in this embodiment instead of the locking manner in FIG. 5. In detail, in this embodiment, a substrate 110g includes a first positioning element 117g, and a fixing ring 130g includes a second positioning element 137g. The first positioning element 117g and the second positioning element 137g are fitted with each other to fix the fixing ring 130g on the substrate 110g. Here, the first positioning element 117g is embodied as a convex portion, and the second positioning element 137g is embodied as a concave portion.

In short, the wavelength conversion modules 100f and 100g enable the fixing rings 130f and 130g to be fixed on the substrates 110f and 110g through latching technology, wherein as long as one of the first positioning elements 117f and 117g and the second positioning elements 137f and 137g is a concave portion, and the other one of the first positioning elements 117f and 117g and the second positioning elements 137f and 137g is a convex portion, latching can be achieved.

Figure 7A:
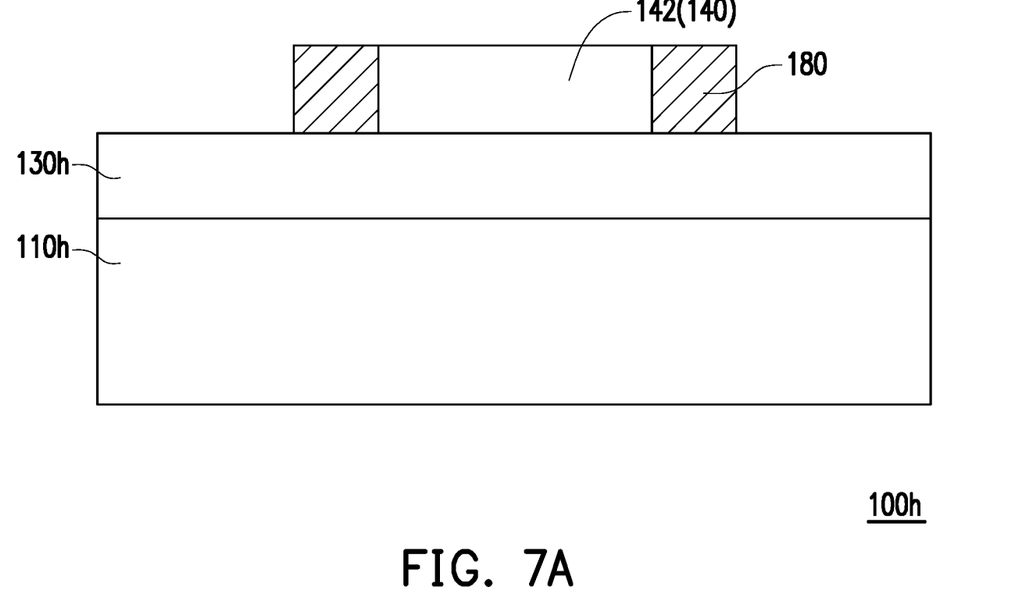
FIG. 7A is a side schematic view of a wavelength conversion module according to another embodiment of the present invention.
Figure 7B:
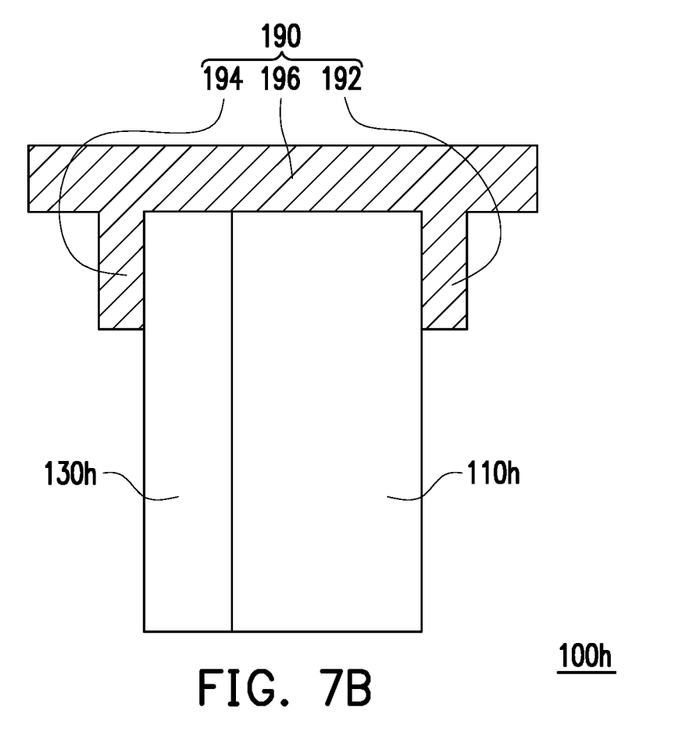
FIG. 7B is a side schematic view of the wavelength conversion module of FIG. 7A from another viewing angle.

FIG. 7A is a side schematic view of a wavelength conversion module according to another embodiment of the present invention. FIG. 7B is a schematic side view of the wavelength conversion module of FIG. 7A from another viewing angle. Referring to FIG. 6A, FIG. 6B, FIG. 7A, and FIG. 7B at the same time, a wavelength conversion module 100h of this embodiment is similar to the wavelength conversion module 100f of FIG. 6A and the wavelength conversion module 100g of FIG. 6B with the difference between the three being that in this embodiment, the wavelength conversion module 100h further includes an inner elastic collar 180 and an outer elastic collar 190 to achieve the effect of axial fixation. In detail, the inner elastic collar 180 is sleeved on the rotating shaft 142 of the driving assembly 140 and is configured to press onto a fixing ring 130h to achieve the effect of limiting the displacement of the fixing ring 130h in the axial direction. The outer elastic collar 190 is sleeved around a substrate 110h and the fixing ring 130h to fix the substrate 110h and the fixing ring 130h together. Here, the outer elastic collar 190 includes a first limiting portion 192, a second limiting portion 194, and a connecting limiting portion 196, wherein the connecting limiting portion 196 connects the first limiting portion 192 and the second limiting portion 194, and the first limiting portion 192, the second limiting portion 194, and the connecting limiting portion 196 have, for example, an integrally formed structure, but not limited thereto. In particular, the first limiting portion 192 is located on the substrate 110h, and the second limiting portion 194 is located on the fixing ring 130h to clamp the substrate 110h and the fixing ring 130h between the first limiting portion 192 and the second limiting portion 194 to achieve the effect of axial fixation. In another embodiment, the first limiting portion 192 may also be located on the fixing ring 130h, and the second limiting portion 194 may be located on the substrate 110h to clamp the substrate 110h and the fixing ring 130h between the first limiting portion 192 and the second limiting portion 194 to achieve the effect of axial fixation. In this embodiment, the inner elastic collar 180 directly contacts the rotating shaft 142 of the driving assembly 140, and the outer elastic collar 190 directly contacts the fixing ring 130h and the substrate 110h. Here, the material of the inner elastic collar 180 and the outer elastic collar 190 is, for example, an elastic material, such as heat-resistant plastic.

It is worth mentioning that different materials of the fixing rings 130a, 130b, 130f, 130g, and 130h may adopt different manners of fixation. For example, in an embodiment, when the fixing rings 130a, 130b, 130f, 130g, and 130h are made of metal materials, a locking member (such as screw locking), welding, a heat-resistant plastic collar, or a C-shaped metal positioning ring may be adopted to fix the fixing rings to the substrates 110a, 110b, 110f, 110g, and 110h. In another embodiment, when the fixing rings 130a, 130b, 130f, 130g, and 130h are made of thermosetting plastic materials, a locking member (such as screw locking), a heat-resistant plastic collar, or a C-shaped metal positioning ring may be adopted to fix the fixing rings to the substrates 110a, 110b, 110f, 110g, and 110h. In yet another embodiment, when the fixing rings 130a, 130b, 130f, 130g, and 130h are made of ceramic materials, a locking member (such as screw locking), a heat-resistant plastic collar, or a C-shaped metal positioning ring may be adopted to fix the fixing rings to the substrates 110a, 110b, 110f, 110g, and 110h.

In summary, the embodiments of the present invention have at least one of the following advantages or effects. In the design of the wavelength conversion module of the present invention, the fixing ring is configured to press on a portion of the wavelength conversion member corresponding to the inner region and the outer region of the groove of the substrate, so as to fix the wavelength conversion member on the substrate. Compared with the prior art of using glue to fix the wavelength conversion layer and the substrate, the wavelength conversion module of the present invention can eliminate the peeling of the wavelength conversion layer due to thermal degradation of the glue in the prior art. The wavelength conversion module of the present invention has better structural reliability and assembly flexibility, and can be disassembled and adjusted at any time. In addition, the projection device adopting the wavelength conversion module of the present invention can have better projection quality and product competitiveness.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, comprising:
   a substrate, having an annular region, and a groove formed on at least a portion of the annular region;
   a wavelength conversion member, disposed in the groove of the substrate; and
   a fixing ring, disposed on the substrate and is configured to press on a portion of the wavelength conversion member corresponding to an inner region and an outer region of the groove, so as to expose another portion of the wavelength conversion member and fix the wavelength conversion member on the substrate, wherein the inner region and the outer region of the groove have different radial distances from a center of the substrate.

2. The wavelength conversion module according to claim 1, wherein the groove is O-shaped and is formed on all of the annular region.

3. The wavelength conversion module according to claim 2, wherein the fixing ring comprises an inner fixing ring and an outer fixing ring, the portion of the wavelength conversion member comprises an inner portion and an outer portion, the inner fixing ring is configured to press on the inner portion of the wavelength conversion member corresponding to the inner region of the groove, and the outer fixing ring is configured to press on the outer portion of the wavelength conversion member corresponding to the outer region of the groove.

4. The wavelength conversion module according to claim 3, wherein a width of the inner fixing ring is greater than or equal to a width of the outer fixing ring.

5. The wavelength conversion module according to claim 1, wherein the groove is C-shaped and is formed on the portion of the annular region.

6. The wavelength conversion module according to claim 5, wherein the fixing ring comprises an inner fixing ring, an outer fixing ring and a connecting portion, wherein the portion of the wavelength conversion member comprises an inner portion and an outer portion, the inner fixing ring is configured to press on the inner portion of the wavelength conversion member corresponding to the inner region of the groove, the outer fixing ring is configured to press on the outer portion of the wavelength conversion member corresponding to the outer region of the groove, the connecting portion connects the inner fixing ring and the outer fixing ring, and the inner fixing ring, the outer fixing ring, and the connecting portion are integrally formed.

7. The wavelength conversion module according to claim 5, wherein a width of the inner fixing ring is greater than or equal to a width of the outer fixing ring.

8. The wavelength conversion module according to claim 5, further comprising:
   a reflective layer, disposed on the fixing ring and located at the connecting portion.

9. The wavelength conversion module according to claim 1, further comprising:
   a plurality of locking members, passing through the fixing ring and locking on the substrate.

10. The wavelength conversion module according to claim 1, wherein the substrate comprises a first positioning element, the fixing ring comprises a second positioning element, and the first positioning element and the second positioning element are fitted with each other to fix the fixing ring on the substrate.

11. The wavelength conversion module according to claim 10, wherein one of the first positioning element and the second positioning element is a concave portion, and other one of the first positioning element and the second positioning element is a convex portion.

12. The wavelength conversion module according to claim 1, further comprising:
   a driving assembly, driving the substrate and the fixing ring to rotate with a rotating shaft of the driving assembly as a central axis, wherein the fixing ring is disposed around the rotating shaft of the driving assembly and is perpendicular to the rotating shaft.

13. The wavelength conversion module according to claim 12, wherein the substrate and the fixing ring are respectively configured coaxially with the driving assembly.

14. The wavelength conversion module according to claim 12, further comprising:
   an inner elastic collar, sleeved on the rotating shaft of the driving assembly and is configured to press onto the fixing ring; and
   an outer elastic collar, sleeved around the substrate and the fixing ring to fix the substrate and the fixing ring together.

15. The wavelength conversion module according to claim 14, wherein the outer elastic collar comprises a first limiting portion, a second limiting portion, and a connecting limiting portion, the connecting limiting portion connects the first limiting portion and the second limiting portion, one of the first limiting portion and the second limiting portion is located on the substrate, and other one of the first limiting portion and the second limiting portion is located on the fixing ring to clamp the substrate and the fixing ring between the first limiting portion and the second limiting portion.

16. The wavelength conversion module according to claim 1, further comprising:

a thermal interface material (TIM), disposed in the groove of the substrate and located between the wavelength conversion member and the groove.

17. A projection device, comprising:

an illumination system, configured to provide an illumination light beam, wherein the illumination system comprises:

a light source module, configured to provide an excitation light beam; and a wavelength conversion module, receiving the excitation light beam and disposed on a transmission path of the illumination light beam, wherein the wavelength conversion module comprises:

a substrate, having an annular region, and a groove formed on at least a portion of the annular region;

a wavelength conversion member, disposed in the groove of the substrate; and a fixing ring, disposed on the substrate and is configured to press on a portion of the wavelength conversion member corresponding to an inner region and an outer region of the groove, so as to expose another portion of the wavelength conversion member and fix the wavelength conversion member on the substrate, wherein the inner region and the outer region of the groove have different radial distances from a center of the substrate;

a light valve, disposed on the transmission path of the illumination light beam to convert the illumination light beam into an image light beam; and a projection lens, disposed on a transmission path of the image light beam to project the image light beam out of the projection device.

18. The projection device according to claim 17, wherein the excitation light beam forms a light spot on the wavelength conversion module, and the light spot is located on the another portion of the wavelength conversion member exposed by the fixing ring.

* * * * *